United States Patent [19]

Laas et al.

[11] Patent Number: 6,043,332

[45] Date of Patent: Mar. 28, 2000

[54] PROCESS FOR THE PRODUCTION OF LIGHT-COLORED URETDIONE POLYISOCYANATES

[75] Inventors: Hans-Josef Laas, Köln; Reinhard Halpaap, Odenthal; Hans-Ulrich Meier-Westhues, Leverkusen; Ulrich Freudenberg, Pulheim, all of Germany

[73] Assignee: Bayer Aktiengesellschaft, Leverkusen, Germany

[21] Appl. No.: 09/129,584

[22] Filed: Aug. 5, 1998

[30] Foreign Application Priority Data

Aug. 13, 1997 [DE] Germany .............................. 197 35 043

[51] Int. Cl.$^7$ ......................... C08G 18/00; C08G 18/08; C08G 18/22; C07D 229/00; C07D 273/00

[52] U.S. Cl. .......................... 528/51; 524/115; 524/147; 524/151; 524/153; 524/154; 528/44; 540/202

[58] Field of Search ..................................... 524/115, 147, 524/151, 153, 154; 528/44, 51; 540/202

[56] References Cited

U.S. PATENT DOCUMENTS

| | | | |
|---|---|---|---|
| 4,476,054 | 10/1984 | Disteldorf et al. | 260/239 A |
| 4,595,534 | 6/1986 | Scholl | 260/239 A |
| 4,614,785 | 9/1986 | Richter et al. | 528/45 |
| 4,668,780 | 5/1987 | Disteldorf et al. | 540/202 |
| 4,912,210 | 3/1990 | Disteldorf et al. | 540/202 |
| 4,929,724 | 5/1990 | Engbert et al. | 540/202 |
| 4,994,541 | 2/1991 | Dell et al. | 528/51 |
| 5,043,092 | 8/1991 | Pedain et al. | 252/182.21 |

FOREIGN PATENT DOCUMENTS

| | | |
|---|---|---|
| 2095997 | 11/1993 | Canada . |
| 735027 | 10/1996 | European Pat. Off. . |
| 1153815 | 5/1969 | United Kingdom . |

*Primary Examiner*—Patrick D. Niland
*Attorney, Agent, or Firm*—Joseph C. Gil; Thomas W. Roy

[57] ABSTRACT

The present invention relates to a process for the production of polyisocyanates containing uretdione groups by a) oligomerizing a portion of the isocyanate groups of diisocyanates having aliphatically and/or cycloaliphatically bound isocyanate groups in the presence of catalysts or catalyst systems which accelerate the dimerization of isocyanate groups and in the presence of trisubstituted phosphite stabilizers corresponding to formula (I)

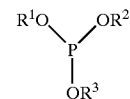

b) optionally termination of the oligomerization reaction at a degree of oligomerization of 10 to 60% by adding a catalyst poison and c) optionally removing unreacted diisocyanate by extraction or thin-layer distillation.

The present invention also relates to the use of the resulting uretdione polyisocyanates as a starting component for polyurethane plastics, particularly as an isocyanate component for the production of uretdione hardeners for powder coating compositions.

16 Claims, No Drawings

PROCESS FOR THE PRODUCTION OF LIGHT-COLORED URETDIONE POLYISOCYANATES

BACKGROUND OF THE INVENTION

1. Field of the Invention

The present invention relates to a process for the production of light-colored uretdione polyisocyanates and to their use as a starting component for polyurethane plastics, particularly as an isocyanate component for the production of uretdione powder coating hardeners.

2. Description of the Prior Art

The production of aliphatic or cycloaliphatic polyisocyanates having uretdione groups by the catalytic dimerization and optionally trimerization (generic term: oligomerization) of monomeric aliphatic or cycloaliphatic diisocyanates is known and described, e.g., in J. Prakt. Chem. 336 (1994) 185–200. In accordance with the present invention the term "oligomerization" refers to the dimerization and optional trimerization of isocyanates.

The uretdione polyisocyanates obtained by these known processes exhibit a marked inherent color depending upon the type of catalyst used. This color severely limits their potential for use as a starting component for the production of high-grade surface coating resins. Numerous attempts have been made to improve the color quality of uretdione polyisocyanates.

It is known from EP-A 337 116 that carbon dioxide dissolved in the starting monomer has a considerable influence on the color of the products during the phosphine-catalyzed dimerization of aliphatic diisocyanates. Only after removing the dissolved carbon dioxide (e.g., to a residual content of less than 20 ppm) can light-colored uretdione polyisocyanates be produced from 1,6-diisocyanatohexane (HDI).

EP-A 377 177 describes the production of practically colorless HDI uretdiones by tributylphosphine catalysis in the presence of alcoholic co-catalysts and subsequent oxidative brightening of the low-monomer resins obtained after thin-layer distillation with the aid of organic peroxides. However, the handling of suitable peroxides is not without problems, especially on an industrial scale, and in some cases requires considerable safety precautions.

It is proposed in EP-A 569 804 to use (atmospheric) oxygen for the oxidative brightening of aliphatic or cycloaliphatic uretdione polyisocyanates. However, the desired effect occurs only above 80° C., i.e., at temperatures which are sufficient to thermally decompose the uretdione groups. For this reason, products having a low monomer content can only be obtained with difficulty by this process.

EP-A 735 027 describes a variation of the process disclosed in EP-A 317 744 for the production of (cyclo)aliphatic uretdiones by catalysis with 4-dialkylaminopyridines, such as 4-dimethylaminopyridine (DMAP). In this process the dimerization is carried out in the presence of aromatic or araliphatic phosphines or alkyl phosphites with up to 8 carbon atoms in the alkyl radicals. This modified process does provide products with improved color quality, but this is often not sufficient for special applications, for example for the production of uretdione hardeners for clear polyurethane powder coatings. Also, the phosphorus compounds described in EP-A 735 027 are relatively low molecular weight, in some cases foul-smelling, toxic substances, which makes them difficult to handle.

An object of the present invention is to provide a new process for the production of uretdione polyisocyanates which results in light-colored products and does not have the disadvantages previously set forth.

This object may be achieved with the process according to the invention, which is based on the surprising observation that the dimerization of aliphatic or cycloaliphatic diisocyanates with known catalysts results in uretdione polyisocyanates with considerably lower color values than comparable prior art processes if small quantities of special trisubstituted phosphites are added to the reaction mixture.

SUMMARY OF THE INVENTION

The present invention relates to a process for the production of polyisocyanates containing uretdione groups by a) oligomerizing a portion of the isocyanate groups of diisocyanates having aliphatically and/or cycloaliphatically bound isocyanate groups in the presence of catalysts or catalyst systems which accelerate the dimerization of isocyanate groups and in the presence of trisubstituted phosphite stabilizers corresponding to formula (I)

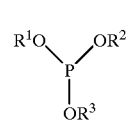

wherein
$R^1$, $R^2$ and $R^3$ are the same or different and represent a linear or branched aliphatic radical optionally containing ether groups or an aromatic or araliphatic radical having up to 18 carbon atoms, or $R^1$ and $R^2$ form a heterocyclic 5- or 6-membered ring together with the phosphorus atom and two oxygen atoms, provided that at least one of the substituents $R^1$, $R^2$ or $R^3$ represents an aromatic radical having 6 to 18 carbon atoms or a linear or branched aliphatic radical having 9 to 18 carbon atoms, b) optionally termination of the oligomerization reaction at a degree of oligomerization of 10 to 60% by adding a catalyst poison and c) optionally removing unreacted diisocyanate by extraction or thin-layer distillation.

The present invention also relates to the use of the resulting uretdione polyisocyanates as a starting component for polyurethane plastics, particularly as an isocyanate component for the production of uretdione hardeners for powder coating compositions.

DETAILED DESCRIPTION OF THE INVENTION

Starting compounds for the process according to the invention include any diisocyanates, such as those prepared by phosgenation or by phosgene-free processes, for example, by urethane cleavage, provided that they contain aliphatically and/or cycloaliphatically bound isocyanate groups, preferably those having a molecular weight range of 140 to 300. Examples include 1,4-diisocyanatobutane, 1,6-diisocyanatohexane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1,3-diisocyanato-2(4)-methylcyclohexane, 1-isocyanato-3,3,5-trimethyl-5-(isocyanatomethyl)-cyclohexane (isophorone diisocyanate or IPDI), 1-isocyanato-1-methyl-4(3)-isocyanatomethyl-cyclohexane, 4,4'-diisocyanatodicyclohexylmethane and mixtures thereof. HDI and/or IPDI are preferably used.

Suitable catalysts or catalyst systems for the process according to the invention include the known compounds for catalyzing the dimerization of aliphatically or cycloaliphatically bound isocyanate groups. Examples include tertiary organic phosphines (e.g., those disclosed in U.S. Pat. No. 4,614,785, herein incorporated by reference, at column 4, lines 11 to 47, U.S. Pat. No. 4,994,541, herein incorporated by reference, DE-A 19 34 763 or DE-A 39 00 053); peralkylated aminophosphines (e.g., those disclosed in DE-A 30 30 513, DE-A 32 27 779, DE-A 34 37 635 and U.S. Pat. Nos. 4,476,054, 4,668,780 and 4,929,724, herein incorporated by reference); 4-dialkylamino-substituted pyridines (e.g. those disclosed in EP-A 3 17 744 and U.S. Pat. No. 4,912,210, herein incorporated by reference); antimony pentafluoride (e.g., disclosed in DE-A 34 20 114 and U.S. Pat. No. 4,595,534, herein incorporated by reference); and boron trifluoride (e.g., disclosed in DE-A 16 70 720).

The tertiary organic phosphines or dialkylamino-substituted pyridines are preferably used as catalysts or catalyst systems in the process according to the invention. Tributylphosphine, trioctylphosphine or 4-dimethylaminopyridine are particularly preferred catalysts.

The catalysts are preferably used in the process according to the invention in an amount of 0.01 to 5 wt. %, more preferably 0.1 to 3 wt. %, based on the weight of the starting diisocyanate used.

In addition to the preceding catalysts, suitable co-catalysts may optionally also be used in the process according to the invention (catalyst systems). They include any organic compounds having at least one hydrogen atom bound to oxygen, nitrogen or sulphur and a $pK_s$ of at least 6, as described, e.g., in DE-A 34 37 635, page 11, line 8 to page 16, line 6 (U.S. Pat. No. 4,929,724, herein incorporated by reference).

Low molecular weight, monohydric or polyhydric alcohols, preferably those having a molecular weight range of 32 to 200, or mixtures of these alcohols, are preferred as co-catalysts. Examples include methanol, ethanol, n-propanol, isopropanol, n-butanol, n-hexanol, 2-ethyl-1-hexanol, 1-methoxy-2-propanol, ethylene glycol, propylene glycol, the isomeric butanediols, hexanediols or octanediols, diethylene glycol, dipropylene glycol, 2-ethyl-1,3-hexanediol, 2,2,4-trimethylpentanediol, glycerol, trimethylolpropane or mixtures thereof.

The co-catalysts are used in the process according to the invention in an amount of up to 5 wt. %, preferably of 0.5 to 3 wt. %, based on the weight of starting diisocyanate used.

The actual co-catalysts are reaction products of the preceding co-catalysts with the starting diisocyanate. Accordingly, instead of using the preceding co-catalysts, it is also possible to use their separately produced reaction products with isocyanates. Examples of these reaction products include urethanes obtained by reacting the preferred alcoholic co-catalysts with starting diisocyanate.

According to the process of the invention, the oligomerization reaction is carried out in the presence of special phosphite stabilizers. The trisubstituted phosphite compounds are known and correspond to formula (I)

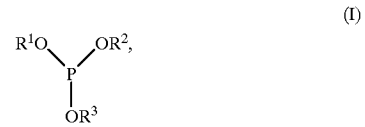

(I)

wherein
$R^1$, $R^2$ and $R^3$ are the same or different represent a linear or branched aliphatic radical optionally containing ether groups or an aromatic or araliphatic radical having up to 18 carbon atoms, or $R^1$ and $R^2$ form a heterocyclic 5- or 6-membered ring together with the phosphorus atom and two oxygen atoms, provided that at least one of the substituents $R^1$, $R^2$ or $R^3$ represents an aromatic radical having 6 to 18 carbon atoms or a linear or branched aliphatic radical having 9 to 18 carbon atoms.

The aromatic and araliphatic radicals as well as the heterocyclic ring may be substituted by groups which do not adversely affect the oligomerization reaction.

Suitable stabilizers include aryl phosphites, such as triphenyl phosphite or tris(nonylphenyl) phosphite; alkyl-aryl phosphites such as diphenyl isooctyl phosphite, diphenyl isodecyl phosphite, diisodecyl phenyl phosphite, diisooctyl octylphenyl phosphite, phenyl neopentyl glycol phosphite or 2,4,6-tri-tert.-butylphenyl-(2-butyl-2-ethyl-1,3-propanediol) phosphite; alkyl phosphites such as triisodecyl phosphite, trilauryl phosphite or tris(tridecyl) phosphite; and aromatically or aliphatically substituted diphosphites such as diisodecyl pentaerythritol diphosphite, distearyl pentaerythritol diphosphite, bis(2,4-di-tert.-butylphenyl)pentaerythritol diphosphite or tetraphenyl dipropylene glycol diphosphite.

Preferred phosphite stabilizers are those in which at least one of the substituents $R^1$, $R^2$ or $R^3$ is a linear or branched, aliphatic radical having 10 to 16 carbon atoms or a phenyl radical. Triisodecyl phosphite, phenyl diisodecyl phosphite and diphenyl isodecyl phosphite are particularly preferred.

The stabilizers of formula (I) are used in the process according to the invention in an amount of 0.01 to 10 wt. %, preferably of 0.1 to 5 wt. % and more preferably of 0.5 to 3 wt. %, based on the weight of starting diisocyanate.

The oligomerization reaction is optionally terminated with the aid of suitable catalyst poisons when 10 to 60% (degree of conversion) of the isocyanate groups originally present in the starting mixture have reacted. Suitable catalyst poisons include alkylating, agents such as dimethyl sulfate or methyl p-toluenesufonate, acylating a(gents such as benzoyl chloride, acids such as perfluorobutanesulfonic acid, sulfur or sulfonyl isocyanates (e.g. U.S. Pat. No. 4,614,785, column 5, line 27 to column 6, line 35) and silylated acids (e.g. EP-A 520 210).

The quantity of catalyst poison needed to stop the reaction depends upon the quantity of catalyst used. In general an equimolar quantity of the terminating agent is used, based on the dimerization catalyst added during the oligomerization reaction. However, due to catalyst losses that may occur during the reaction, as little as 20 to 80 equivalent % of the catalyst poison, based on the catalyst originally used, may be sufficient.

The process according to the invention is preferably carried out in the melt. However, it may also be carried out in the presence of solvents which are inert to isocyanate (groups. Suitable solvents include hexane, toluene, xylene, chlorobenzene, ethyl acetate, butyl acetate, ethylene glycol acetate, propylene glycol monomethyl ether acetate, acetone, methyl isobutyl ketone, methylene chloride, N-methylpyrrolidone or any mixtures thereof.

To carry out the process according to the invention, the starting diisocyanate is heated to a temperature of 20 to 100° C., preferably 20 to 70° C., together with the phosphite stabilizer, optionally under an inert gas, such as nitrogen, and optionally in the presence of a suitable solvent. The co-catalyst, preferably an alcoholic co-catalyst, may optionally then be mixed in. Following this, optionally after completion of the spontaneous reaction between co-catalyst and starting diisocyanate, a dimerization catalyst is added in the required amount and the reaction temperature is optionally adjusted by either heating or cooling to a temperature of 20 to 120° C., preferably 25 to 80° C. The reaction may optionally be terminated when a degree of oligomerization of 10 to 60%, preferably 10 to 40%, is reached by adding a catalyst poison and, optionally, brief subsequent heating of the reaction mixture to a temperature above 80° C., preferably above 120° C.

"Degree of oligomerization" means the percentage of the isocyanate groups originally present in the starting mixture that are consumed during the reaction according to the invention. Isocyanate groups may be consumed by dimerization, trimerization and, when co-catalysts are used, by reaction with isocyanate groups, for example, to form urethane groups. The degree of oligomerization is (generally obtained after a reaction period of 1 to 48, preferably 2 to 24 hours.

The reaction mixture is preferably then freed from volatile components (excess monomeric diisocyanates, optional solvents, volatile phosphite stabilizers and, when no catalyst poison is used, volatile catalysts) by thin layer distillation in a high vacuum (e.g. <1 mbar) under the mildest possible conditions, for example, at a temperature of 100 to 200° C., preferably 120 to 180° C.

In addition, the volatile components mentioned may be separated off from the oligomerization product by extraction with suitable solvents which are inert to isocyanate groups. Examples include aliphatic or cycloaliphatic hydrocarbons such as pentane, hexane, heptane, cyclopentane and cyclohexane.

Depending upon the type of starting diisocyanate used, polyisocyanate mixtures containing, uretdione groups are obtained, which are liquid or highly viscous at room temperature and have a content of aliphatically and/or cycloaliphatically bound isocyanate groups of 10 to 30 wt. %, preferably of 15 to 25 wt. %, and contain less than 5 wt % preferably less than 2 wt. %, most preferably less than 1 wt. % of monomeric starting diisocyanates. These products are much lighter in color (considerably less inherent color) compared to uretdione polyisocyanates produced by known dimerization processes without the addition of the phosphite stabilizers which are essential to the invention.

The distillates obtained, which contain unreacted monomeric starting diisocyanates and optionally solvents, phosphite stabilizers and catalyst may be used in a subsequent oligomerization reaction.

It is also possible to omit the separation of the excess, unreacted diisocyanates in the process according to the invention after partial catalytic dimerization and termination of the reaction at the desired degree of oligomerization by the addition of a catalyst poison. In this case, clear, light-colored solutions of polyisocyanates containing uretdione groups and up to 70 wt. % of monomeric starting diisocyanate are obtained as the products of the process.

The uretdione polyisocyanates obtainable by the process according to the invention, or the solutions thereof in monomeric starting diisocyanates, represent valuable starting materials for the production of polyurethane plastics by the poly-addition process, preferably for the production of one-pack or two-pack polyurethane coatings. They are especially suitable as the isocyanate component for the production of uretdione hardeners for powder coating compositions.

EXAMPLES

All parts and percentages are by weight, unless otherwise specified.

The HAZEN color values were determined with the aid of a Neo-Komparator from Hellige (Freiburg).

Example 1

At room temperature under dry nitrogen, 5 g (0.5%) of diisodecyl phenyl phosphite as stabilizer, 10 g (1.0%) of 1,3-butanediol as co-catalyst and 3 g (0.3%/0.015 mol) of tri-n-butylphosphine as catalyst were added consecutively to 1000 g (5.95 mol) of hexamethylene diisocyanate (HDI) and the mixture was then heated to 60° C. After a reaction period of 4.5 hours, the NCO content of the reaction mixture was 42.0%, corresponding to a degree of oligomerization of 14.5%. The reaction was stopped by adding 2.8 g (0.015 mol) of methyl p-toluenesulfonate and heating for one hour at 80° C. After thin layer distillation at a temperature of 140° C. and a pressure of 0.5 mbar, a colorless polyisocyanate containing uretdione groups was obtained, having an NCO content of 21.5%, a monomeric HDI content of 0.3%, a viscosity (according to DIN 53 018) of 240 mPas (23° C.) and a HAZEN color value of 15–20.

For comparison, an HDI polyisocyanate was produced in the same way but without using diisodecyl phenyl phosphite. The slightly yellow resin had an NCO content of 21.6%, a monomeric HDI content of 0.2%, a viscosity (according to DIN 53 018) of 240 mPas (23° C.) and a HAZEN color value of 50. The comparison demonstrates that the dimerization according to the invention in the presence of the phosphite stabilizer provided a much lighter product.

Example 2

At room temperature under dry nitrogen, 10 g (1%) of triphenyl phosphite as stabilizer and 20 g (2%) of 4-dimethylaminopyridine (DMAP) as catalyst were added consecutively, with stirring, to 1000 g (4.50 mol) of isophorone diisocyanate (IPDI). After 20 hours, the light yellow reaction mixture, which had an NCO content of 28.7%, corresponding to a degree of oligomerization of 21.8%, was freed from volatile components, without the previous addition of a catalyst poison, with the aid of a thin layer evaporator at a temperature of 160° C. and a pressure of 0.3 mbar. A yellow uretdione polyisocyanate was obtained, having an NCO content of 17.8%, a monomeric IPDI content of 0.3%, a viscosity (according to DIN 53 018) of more than 200,000 mPas (23° C.) and a HAZEN color value, determined on a 10% solution in methylene chloride, of 30.

An IPDI uretdione was produced for comparison purposes in accordance with EP-A 317 744 (U.S. Pat. No. 4,912,210) without using the stabilizer. The resulting product was highly viscous and yellow and had an NCO content of 17.5%, a monomeric IPDI content of 0.3%, and a HAZEN color value of 70 as a 10% solution in methylene chloride. The comparison demonstrates that the dimerization according to the invention in the presence of the phosphite stabilizer provided a much lighter product.

Examples 3–8

IPDI uretdiones were produced by the process described in Example 2 using different phosphite stabilizers. The degree of oligomerization was between 21 and 22% in every case. Table I sets forth the quantities of catalyst and stabilizer used (based on the weight of starting diisocyanate used in each case) and the properties of the highly viscous resins obtained after thin layer distillation.

Comparative examples 7 and 8 demonstrate that the uretdione polyisocyanates produced according to the invention exhibit much improved color compared with those produced using the trivalent phosphorus compounds described in EP-A 735 027.

stood that such detail is solely for that purpose and that variations can be made therein by those skilled in the art without departing from the spirit and scope of the invention except as it may be limited by the claims.

What is claimed is:

1. A process for the production of a polyisocyanate containing uretdione groups by
    a) oligomerizing a portion of the isocyanate groups of a diisocyanate having aliphatically and/or cycloaliphatically bound isocyanate groups in the presence of a catalyst which accelerates the dimerization of isocyanate groups and in the presence of a trisubstituted phosphite stabilizer corresponding to formula (I)

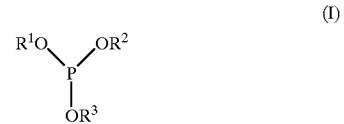

wherein
$R^1$, $R^2$ and $R^3$ are the same or different and represent a linear or branched aliphatic radical optionally containing ether groups or an aromatic or araliphatic radical having up to 18 carbon atoms, or $R^1$ and $R^2$ form a heterocyclic 5- or 6-membered ring together with the phosphorus atom and two oxygen atoms, provided that at least one of the substituents $R^1$, $R^2$ or $R^3$ represents an aromatic radical having 6 to 18 carbon atoms or a linear or branched aliphatic radical having 9 to 18 carbon atoms,
    b) optionally termination of the oligomerization reaction at a degree of oligomerization of 10 to 60% by adding a catalyst poison and
    c) optionally removing unreacted diisocyanate by extraction or thin-layer distillation.

2. The process of claim 1 wherein said dimerization catalyst comprises a trialkyl phosphine and/or a dialkylaminopyridine.

TABLE 1

| Example | 3 | 4 | 5 | 6 | 7 Comparison (according to EP-A 735 027) | 8 Comparison (according to EP-A 735 027) |
|---|---|---|---|---|---|---|
| DMAP[a] [%] | 1 | 2 | 2 | 1 | 2 | 2 |
| Triisodecyl phosphite [%] | 1 | — | — | — | — | — |
| Diisodecyl phenyl phosphite [%] | — | 2 | — | — | — | — |
| Diphenyl isooctyl phosphite [%] | — | — | 2 | — | — | — |
| Distearyl pentaerythritol diphosphite [%] | — | — | — | 1 | — | — |
| Triphenyl phosphine [%] | — | — | — | — | 2 | — |
| Tributyl phosphite [%] | — | — | — | — | — | 2 |
| NCO content [%] | 17.5 | 17.3 | 17.5 | 17.5 | 17.4 | 17.6 |
| Monomeric IPDI | pale yellow | yellow | pale yellow | pale yellow | yellowish brown | yellow |
| Color | 0.4 | 0.3 | 0.3 | 0.2 | 0.3 | 0.4 |
| Hazen color value[b] | 15 | 30 | 30 | 25 | 50 | 40 |

[a] 4-dimethylaminopyridine
[b] determined on a 10% solution in methylene chloride in each case Although the invention has been described in detail in the foregoing for the purpose of illustration, it is to be under- 3. The process of claim 1 wherein said dimerization catalyst comprises tributyl phosphine or trioctyl phosphine.

4. The process of claim 1 wherein said dimerization catalyst comprises 4-dimethylaminopyridine.

5. The process of claim 1 wherein said diisocyanate comprises 1,6-diisocyanatohexane and/or 1-isocyanato-3,3,5-trimethyl-5-(isocyanatomethyl)-cyclohexane.

6. The process of claim 2 wherein said diisocyanate comprises 1,6-diisocyanatohexane and/or 1-isocyanato-3,3,5-trimethyl-5-(isocyanatomethyl)-cyclohexane.

7. The process of claim 3 wherein said diisocyanate comprises 1,6-diisocyanatohexane and/or 1-isocyanato-3,3,5-trimethyl-5-(isocyanatomethyl)-cyclohexane.

8. The process of claim 4 wherein said diisocyanate comprises 1,6-diisocyanatohexane and/or 1-isocyanato-3,3,5-trimethyl-5-(isocyanatomethyl)-cyclohexane.

9. The process of claim 1 wherein said stabilizer comprises triisodecyl phosphite, phenyl diisodecyl phosphite or diphenyl isodecyl phosphite.

10. The process of claim 2 wherein said stabilizer comprises triisodecyl phosphite, phenyl diisodecyl phosphite or diphenyl isodecyl phosphite.

11. The process of claim 3 wherein said stabilizer comprises triisodecyl phosphite, phenyl diisodecyl phosphite or diphenyl isodecyl phosphite.

12. The process of claim 4 wherein said stabilizer comprises triisodecyl phosphite, phenyl diisodecyl phosphite or diphenyl isodecyl phosphite.

13. The process of claim 5 wherein said stabilizer comprises triisodecyl phosphite, phenyl diisodecyl phosphite or diphenyl isodecyl phosphite.

14. The process of claim 6 wherein said stabilizer comprises triisodecyl phosphite, phenyl diisodecyl phosphite or diphenyl isodecyl phosphite.

15. The process of claim 7 wherein said stabilizer comprises triisodecyl phosphite, phenyl diisodecyl phosphite or diphenyl isodecyl phosphite.

16. The process of claim 8 wherein said stabilizer comprises triisodecyl phosphite, phenyl diisodecyl phosphite or diphenyl isodecyl phosphite.

\* \* \* \* \*